US012570583B2

(12) United States Patent (10) Patent No.: US 12,570,583 B2
Mehr et al. (45) Date of Patent: Mar. 10, 2026

(54) HYBRID HIGH AND LOW TEMPERATURE COATING

(71) Applicant: Honeywell International Inc., Charlotte, NC (US)

(72) Inventors: Mehrad Mehr, Raleigh, NC (US); Bahram Jadidian, Watchung, NJ (US)

(73) Assignee: Honeywell International Inc., Charlotte, NC (US)

( * ) Notice: Subject to any disclaimer, the term of this patent is extended or adjusted under 35 U.S.C. 154(b) by 213 days.

(21) Appl. No.: 17/818,825

(22) Filed: Aug. 10, 2022

(65) Prior Publication Data

US 2024/0051885 A1 Feb. 15, 2024

(51) Int. Cl.

| | |
|---|---|
| *C04B 41/52* | (2006.01) |
| *C04B 35/83* | (2006.01) |
| *C04B 41/45* | (2006.01) |
| *C04B 41/50* | (2006.01) |
| *C04B 41/86* | (2006.01) |
| *C04B 41/87* | (2006.01) |
| *C04B 41/89* | (2006.01) |

(52) U.S. Cl.
CPC ............ *C04B 41/522* (2013.01); *C04B 35/83* (2013.01); *C04B 41/4535* (2013.01); *C04B 41/4558* (2013.01); *C04B 41/5022* (2013.01); *C04B 41/5059* (2013.01); *C04B 41/5061* (2013.01); *C04B 41/86* (2013.01); *C04B 41/87* (2013.01); *C04B 41/89* (2013.01); *C04B 2235/422* (2013.01); *C04B 2235/5248* (2013.01)

(58) Field of Classification Search
CPC ... C04B 41/522; C04B 35/83; C04B 41/4535;

C04B 41/4558; C04B 41/5022; C04B 41/5059; C04B 41/5061; C04B 41/86; C04B 41/87; C04B 41/89; C04B 2235/422; C04B 2235/5248; C04B 41/52; C04B 41/009; C04B 2111/00362; F16D 69/023

See application file for complete search history.

(56) References Cited

U.S. PATENT DOCUMENTS

| | | | |
|---|---|---|---|
| 4,465,777 A | 8/1984 | Shuford | |
| 5,022,961 A | 6/1991 | Izumi | |
| 5,283,109 A | 2/1994 | Kaplan et al. | |
| 5,352,484 A | 10/1994 | Bernard et al. | |

(Continued)

FOREIGN PATENT DOCUMENTS

| | | |
|---|---|---|
| CN | 102745998 A | 10/2012 |
| CN | 103030427 A | 4/2013 |

(Continued)

OTHER PUBLICATIONS

Extended Search Report from counterpart European Application No. 23187057.7 dated Jan. 15, 2024, 7 pp.

(Continued)

*Primary Examiner* — Nathan L Van Sell
(74) *Attorney, Agent, or Firm* — Shumaker & Sieffert, P.A.

(57) ABSTRACT

A high temperature article includes a carbon/carbon (C/C) composite substrate and a hybrid coating on the C/C composite substrate. The hybrid coating includes a high temperature antioxidant layer on a surface of the C/C composite substrate and a low temperature sealant on a surface of the high temperature antioxidant layer. The low temperature sealant is formed from a glass-forming soluble salt.

12 Claims, 6 Drawing Sheets

(56) References Cited

U.S. PATENT DOCUMENTS

| | | | |
|---|---|---|---|
| 6,551,709 | B1 | 4/2003 | Stover |
| 6,555,173 | B1 | 4/2003 | Forsythe et al. |
| 8,383,197 | B2 | 2/2013 | La Forest et al. |
| 9,388,087 | B2 | 7/2016 | Don |
| 2004/0213906 | A1 | 10/2004 | Mazany et al. |
| 2005/0153125 | A1 | 7/2005 | Shiokawa et al. |
| 2006/0008647 | A1 | 1/2006 | Walker et al. |
| 2007/0172659 | A1 | 7/2007 | Shao |
| 2007/0199626 | A1 | 8/2007 | Diss et al. |
| 2015/0175476 | A1* | 6/2015 | Diss .................... C03C 8/16 |
| | | | 428/428 |
| 2018/0240878 | A1 | 8/2018 | Scoggins |
| 2022/0388917 | A1 | 12/2022 | Jadidian et al. |

FOREIGN PATENT DOCUMENTS

| | | | |
|---|---|---|---|
| CN | 103030438 | A | 4/2013 |
| CN | 105777208 | A | 7/2016 |
| CN | 107056336 | A | 8/2017 |
| CN | 107673762 | A | 2/2018 |
| CN | 109665866 | A | 4/2019 |
| JP | H0543364 | A | 2/1993 |
| JP | 2000327461 | A | 11/2000 |
| JP | 2002274979 | A | 9/2002 |

OTHER PUBLICATIONS

Wang et al., "Study on Microstructure Characteristics of Axially Braided Carbon/Carbon Composites Based on SEM and Micro-CT," MDPI, Materials, vol. 13, No. 6, doi:10.3390/ma13061414, Mar. 20, 2020, 15 pp.

Iyer "Characterization of Composite Dust generated during Milling of Uni-Directional and Random fiber composites" Master Thesis University of Washington 2015, (Applicant points out, in accordance with MPEP 609.04(a), that the year of publication, 2015, is sufficiently earlier than the effective U.S. filing date, so that the particular month of publication is not in issue.) 196 pgs.

Response to Extended Search Report dated Jan. 15, 2024, from counterpart European Application No. 23187057.7 filed Mar. 27, 2024, 10 pp.

Technical data sheet from Orion procured from https://orioncarbons.com/wp-content/uploads/2023/04/22_06_21_td_0112_farbrusstabelle_emea_web_2.pdf © 2021, (Applicant points out, in accordance with MPEP 609.04(a), that the year of publication, 2021, is sufficiently earlier than the effective U.S. filing date, so that the particular month of publication is not in issue.) 8 pgs.

* cited by examiner

HYBRID HIGH AND LOW TEMPERATURE COATING

TECHNICAL FIELD

In some examples, the disclosure relates to high temperature coatings.

BACKGROUND

Carbon-carbon (C/C) composites may be used in high temperature applications. For example, the aerospace industry employs C/C composite components as friction materials for commercial and military aircraft, such as brake friction materials. In high temperature applications, C/C composites may be susceptible to oxidation, which may lead to deterioration of physio-mechanical properties.

SUMMARY

The disclosure describes a coating for carbon/carbon composite substrates that is protective at both high and low temperatures. The hybrid coating includes a high temperature antioxidant layer on the C/C composite substrate and a low temperature sealant on the high temperature antioxidant layer. At high temperatures, the high temperature antioxidant layer protects the substrate, while the low temperature sealant undergoes a reversible phase change and remains on a surface of the antioxidant layer. At low temperatures, the low temperature sealant flows into microcracks that may form in the antioxidant layer due to differences in thermal expansion between the antioxidant layer and the substrate and forms a glass that seals the microcracks. In this way, the hybrid coating may protect C/C composite substrates through a range of operating temperatures and conditions.

In one example, a method for forming a hybrid coating includes applying a sealant mixture to a surface of a high temperature antioxidant layer on a carbon/carbon (C/C) composite substrate. The sealant mixture includes a glass-forming soluble salt in a solvent. The method includes removing the solvent to form a low temperature sealant from the glass-forming soluble salt on the high temperature antioxidant layer.

In another example, a high temperature article includes a carbon/carbon (C/C) composite substrate and a hybrid coating on the C/C composite substrate. The hybrid coating includes a high temperature antioxidant layer on a surface of the C/C composite substrate and a low temperature sealant on a surface of the high temperature antioxidant layer. The low temperature sealant is formed from a glass-forming soluble salt.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
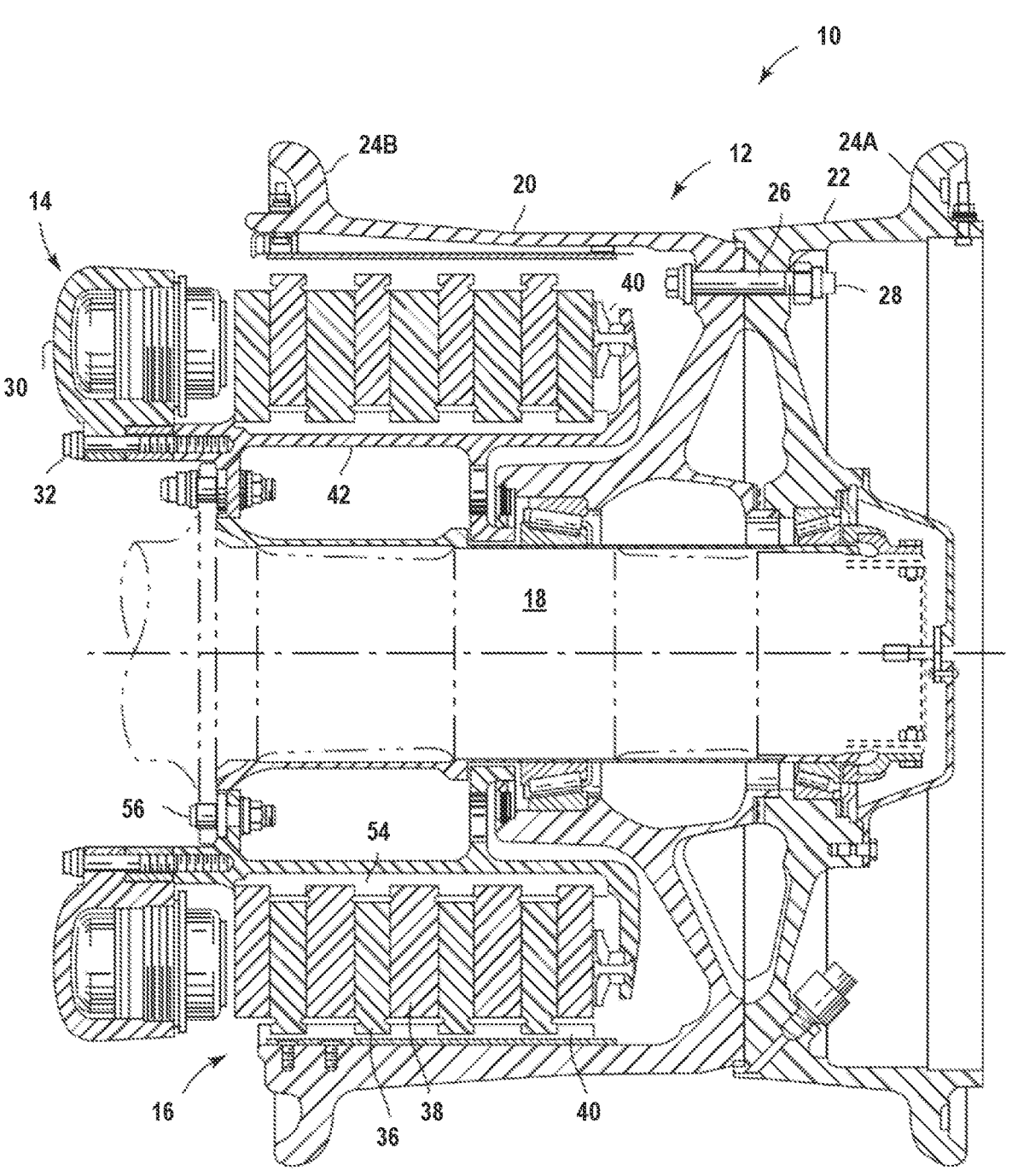
FIG. 1 is a schematic diagram illustrating an example aircraft brake assembly including composite brake disc that include a hybrid high temperature coating, according to examples of the disclosure.

The disclosure describes a coating for carbon/carbon composite substrates that is protective at both high and low temperatures. Carbon-carbon composite components may provide good mechanical properties and have low mass density relative to other materials, such as metal alloys. However, at elevated temperatures (e.g., greater than 400 degrees Celsius (° C.)), carbon-carbon composite components may be susceptible to oxidation, environmental attack, and degradation of physio-mechanical properties. Antioxidant coatings may improve resistance to oxidation and/or environmental attack at high temperatures experienced in aerospace applications, such as aircraft brakes (e.g., temperatures as high as 1600° C.), and hypersonic applications, such as leading edges and rocket nozzles.

Prior to use of a component in an oxidizing atmosphere, a high temperature carbon-composite-based substrate of the component may be coated with an antioxidant coating that may reduce oxidation of an external surface of the substrate at high temperatures. However, as the component cools, microcracks or other defects may form in the antioxidant coating due to differences in the coefficient of thermal expansion between the substrate and the antioxidant coating. These microcracks may permit oxidizing agents to penetrate through the antioxidant coating and attack the underlying substrate. To protect the component at low temperatures, various low temperature oxide-based coatings may be applied to the surface of the component or antioxidant coating. For example, phosphate aluminum oxide may penetrate into the antioxidant coating to seal defects. However, such coatings may require a heat treatment step, and may undergo irreversible damage when heated above a threshold, such as about 900° C.

According to principles of the disclosure, a hybrid coating for a C/C composite component includes both a high temperature antioxidant layer that protects the substrate at high temperatures and a low temperature sealant layer that seals microcracks at low temperatures, thereby permitting operation under cyclical thermal conditions. Both the high temperature antioxidant layer and the low temperature sealant are stable at high temperatures, such as up to about 1600° C. As a result, the hybrid coating may provide continuous protection across a broad temperature range.

The low temperature sealant overlies the antioxidant layer and is formed from a glass-forming soluble salt, such as sodium silicate. At high temperatures, the salt forms a liquid layer that wets the surface of the antioxidant layer and fills any microcracks that may have formed in the antioxidant layer due to thermal expansion or contraction. At low temperatures, the salt forms a glass layer that solidifies to protect the antioxidant layer against migration of oxidizing species into the antioxidant layer. For example, sodium silicate may solidify to form a silica gel on the surface of the antioxidant layer. The glass-forming soluble salt may be applied in a solvent, such as through immersion, spraying, or painting, and may not require any post-treatment heating step beyond removing the solvent. As a result, the low temperature sealant may be applied to a variety of antioxidant layers in a simple, cost-effective manner.

In some examples, the antioxidant layer may be metal-rich metal carbide layer that may provide further protection at high temperatures. At high temperatures, such as greater than 1350° C., excess metal from the antioxidant layer may form a metal oxide that seals the CTE microcracks. This metal oxide may have a higher thermal degradation temperature than the underlying antioxidant layer. As a result, the antioxidant layer may be capable of sealing microcracks through an upper temperature range, such as above about 900° C., while the low temperature sealant is capable of sealing microcracks through a lower temperature range, such as up to about 1100° C.

Hybrid coatings described herein may be used in a variety of high temperature applications, including applications that experience thermal cycles between relatively high and low temperatures. Due to high temperatures experienced by components in high speed, friction, or combustion environments, the high temperature coatings may be particularly suited to aerospace applications. FIG. 1 is a schematic diagram illustrating an example aircraft brake assembly including composite brake disc that include a high temperature coating formed, according to examples of the disclosure. For ease of description, examples of the disclosure will be described primarily with regard to aircraft brake assemblies. However, the articles of this disclosure may be used to form brake components other than aircraft brake discs, and for applications other than brake components. As one example, the brake components may be used as friction materials in other types of braking applications and vehicles. As another example, the articles may be used for leading edges, hypersonic vehicles or weapons, rocket nozzles, and other application involving high temperatures and oxidizing environments.

In the example of FIG. 1, wheel and brake assembly 10 includes a wheel 12, an actuator assembly 14, a brake stack 16, and an axle 18. Wheel 12 includes wheel hub 20, wheel outrigger flange 22, bead seals 24A and 24B, lug bolt 26, and lug nut 28. Actuator assembly 14 includes actuator housing 30, actuator housing bolt 32, and ram 34. Brake stack 16 includes alternating rotor brake discs 36 and stator brake discs 38; rotor brake discs 36 are configured to move relative to stator brake discs 38. Rotor brake discs 36 are mounted to wheel 12, and in particular wheel hub 20, by beam keys 40. Stator brake discs 38 are mounted to axle 18, and in particular torque tube 42, by splines 44. Wheel and brake assembly 10 may support any variety of private, commercial, or military aircraft or other type of vehicle.

Wheel and brake assembly 10 includes wheel 12, which in the example of FIG. 1 is defined by a wheel hub 20 and a wheel outrigger flange 22. Wheel outrigger flange 22 may be mechanically affixed to wheel hub 20 by lug bolts 26 and lug nuts 28. Wheel 12 defines bead seals 24A and 24B. During assembly, an inflatable tire (not shown) may be placed over wheel hub 20 and secured on an opposite side by wheel outrigger flange 22. Thereafter, lug nuts 28 can be tightened on lug bolts 26, and the inflatable tire can be inflated with bead seals 24A and 24B providing a hermetic seal for the inflatable tire.

Wheel and brake assembly 10 may be mounted to a vehicle via torque tube 42 and axle 18. In the example of FIG. 1, torque tube 42 is affixed to axle 18 by a plurality of bolts 46. Torque tube 42 supports actuator assembly 14 and stator brake discs 38. Axle 18 may be mounted on a strut of a landing gear (not shown) or other suitable component of the vehicle to connect wheel and brake assembly 10 to the vehicle.

During operation of the vehicle, braking may be necessary from time to time, such as during landing and taxiing procedures of an aircraft. Wheel and brake assembly 10 is configured to provide a braking function to the vehicle via actuator assembly 14 and brake stack 16. Actuator assembly 14 includes actuator housing 30 and ram 34. Actuator assembly 14 may include different types of actuators such as one or more of, e.g., an electrical-mechanical actuator, a hydraulic actuator, a pneumatic actuator, or the like. During operation, ram 34 may extend away from actuator housing 30 to axially compress brake stack 16 against a compression point for braking.

Brake stack 16 includes alternating rotor brake discs 36 and stator brake discs 38. Rotor brake discs 36 are mounted to wheel hub 20 for common rotation by beam keys 40. Stator brake discs 38 are mounted to torque tube 42 by splines 44. In the example of FIG. 1, brake stack 16 includes four rotors and five stators. However, a different number of rotors and/or stators may be included in brake stack 16 in other examples.

In some examples, rotor brake discs 36 and stator brake discs 38 may be mounted in wheel and brake assembly 10 by beam keys 40 and splines 44, respectively. In some examples, beam keys 40 may be circumferentially spaced about an inner portion of wheel hub 20. Beam keys 40 may, for example, be shaped with opposing ends (e.g., opposite sides of a rectangular) and may have one end mechanically affixed to an inner portion of wheel hub 20 and an opposite end mechanically affixed to an outer portion of wheel hub 20. Beam keys 40 may be integrally formed with wheel hub 20 or may be separate from and mechanically affixed to wheel hub 20, e.g., to provide a thermal barrier between rotor brake discs 36 and wheel hub 20. Toward that end, in different examples, wheel and brake assembly 10 may include a heat shield (not shown) that extends out radially and outwardly surrounds brake stack 16, e.g., to limit thermal transfer between brake stack 16 and wheel 12.

In some examples, splines 44 may be circumferentially spaced about an outer portion of torque tube 42. As such, stator brake discs 38 may include a plurality of radially inwardly disposed lug notches along an inner diameter of the brake disc configured to engage with splines 44. Similarly, rotor brake discs 36 may include a plurality of radially inwardly disposed lug notches along an outer diameter of the brake disc configured to engage with beam keys 40. As such rotor brake discs 36 will rotate with the motion of the wheel while stator brake discs 38 remain stationary allowing the friction surfaces of an adjacent stator brake disc 38 and rotor brake disc 36 to engage with one another to deaccelerate the rotation of wheel 12.

Rotor brake discs 36 and stator brake discs 38 may provide opposing friction surfaces for braking an aircraft. As kinetic energy of a moving aircraft is transferred into thermal energy in brake stack 16, temperatures may rapidly increase in brake stack 16. As such, rotor brake discs 36 and stator brake discs 38 that form brake stack 16 may include coatings capable of operating at very high temperatures and blocking various oxidizing species.

Figure 2:
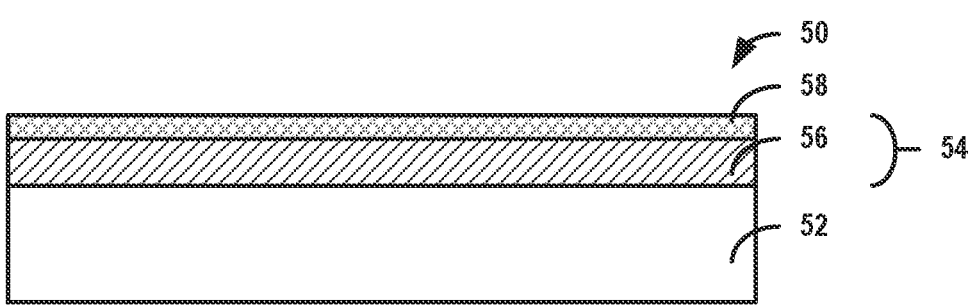
FIG. 2 is a cross-sectional side view diagram illustrating an example article that includes a hybrid high temperature coating, according to examples of the disclosure.

In some examples, articles or components, such as brake discs 36 and/or 38 of FIG. 1 described above, may include a hybrid high temperature coating to protect an underlying substrate from oxidation, such as non-friction surfaces of brake discs. Non-friction surfaces of brake discs 36 may include those surfaces of brake discs 36 that do not engage another opposing surface during, e.g., a braking operation of assembly 10 when the friction surfaces of brake discs 36 are engaged. Such surfaces may be subject to temperature transients, including relatively high temperatures during braking operations followed by relatively low temperatures when the brakes are released. As will be described below, such thermal transients may cause thermal stresses that create defects that may be sealed by hybrid high temperature coatings described herein. FIG. 2 is a cross-sectional side view diagram illustrating an example high temperature article 50 that includes a hybrid high temperature coating, according to examples of the disclosure. High temperature article 50 may be an example of a component in the system of FIG. 1 that defines a non-friction surface, such as a brake disc 36.

High temperature article 50 includes a carbon/carbon (C/C) composite substrate 52. Substrate 52 may include carbon-based reinforcement fibers and a carbon-based matrix material at least partially surrounding the carbon-based reinforcement fibers. In some examples, substrate 52 may be formed form a porous preform that includes carbon fibers or carbon-precursor fibers. Examples of porous preforms that may be used to produce substrate 52 include, but are not limited to: a fibrous preform, such as a woven fiber preform, a nonwoven fiber preform, a chopped-fiber and binder preform, a binder-treated random fiber preform, a carbon fiber preform, or a ceramic fiber preform; a foam preform; a porous carbon body preform; or a porous ceramic body preforms.

In some examples, the porous preform includes a plurality of mechanically bound layers, which can be, for example, a plurality of fibrous layers, such as a plurality of woven or nonwoven fabric layers, connected together, e.g., bound by a binder, such as a resin binder, or via needle-punching of the plurality of layers. In some examples, the layers include one or more tow layers, one or more web layers, or combinations thereof. Tow layers may include one or more tows of fibers. Tows of fibers may be arranged in any suitable arrangement including, for example, linear, radial, chordal, or the like. Web layers may include web fibers, which may include relatively short, chopped, and entangled fibers of fibers. In other examples, the porous preform may not include predefined layers, but, rather, may be formed from a bundle of fibers that are mechanically bound together, e.g., via needling. In other examples, a combination of any of the aforementioned types of porous preforms can be used.

Substrate 52 may also include a matrix material that at least partially encapsulates the carbon fibers. The matrix material may be introduced into the porous preform using one or more of a variety of techniques, including, for example, chemical vapor deposition/chemical vapor infiltration (CVD/CVI), resin transfer molding (RTM), vacuum/pressure infiltration (VPI), high pressure impregnation/carbonization (PIC), or the like.

Substrate 52 may be subject to high temperatures during operation. As one example, carbon-carbon composite brake discs may be subject to temperatures as high as about 3,000 degrees Fahrenheit (° F.) (about 1,649° C.) during braking events. To protect substrate 52 from oxidation, article 50 includes a hybrid high temperature coating 54 on one or more surfaces of substrate 52. Coating 54 may be stable at temperatures of up to about 3600° F. (about 2000° C.). In this context, "stable" may mean that coating 54 does not degrade into its constituent elements, does not react with carbon, and/or does not react with other elements or compounds present in the environment in which coating 54 is used including, but not limited to, oxidation, for a period of time (e.g., minutes or hours). Coating 54 may have any suitable thickness. In some examples, a thickness of coating 54 may be between about 1 micrometer (μm) and about 30 μm. In some examples, a thickness of coating 54 may be self-terminating and determined by diffusion properties of the metal carbon system.

Hybrid high temperature coating 54 includes a high temperature antioxidant layer 56 on a surface of substrate 52. Antioxidant layer 56 may be configured to form a dense coating that substantially reduces migration of oxidizing agents to a surface of substrate 52. A variety of high temperature materials may be used in antioxidant layer 56 including, but not limited to, a metal silicate, including one or more lanthanide disilicates, ytterbium monosilicate, ytterbium disilicate, yttrium monosilicate, yttrium disilicate, aluminum titanate, lutetium disilicate, erbium disilicate, scandium disilicate, holmium disilicate, or mullite; a metal carbide, such as silicon carbide; a metal nitride, such as silicon nitride; and the like. As will be described further below, in some instances, antioxidant layer 56 may have a coefficient of thermal expansion (CTE) that is different from underlying substrate 52, such that thermal transients may create thermal stresses and subsequent defects that may be sealed by hybrid coating 54. As such, antioxidant coating 56 may include a wide variety of different high temperature materials that are not particularly limited by CTE.

In some examples, antioxidant layer 56 includes a metal carbide. Metal carbides may have high strength, wear-resistance, and temperature resistance, and may be chemically compatible with underlying substrate 52. In some examples, the metal carbide includes at least one of silicon carbide, titanium carbide, or tungsten carbide.

In some examples, antioxidant layer 56 that includes a metal carbide may extend into one or more surface voids, such as defects or pores, on the surface of the C/C composite substrate 52 to form a continuous layer that substantially encapsulates substrate 52. For example, substrate 52 may include surface voids that extend from an outer surface of substrate 52 into a bulk of substrate 52. Surface voids may include defects such as cracks, inherent structures such as surface pores, or other voids or roughness in the surface that extend into substrate 52 and may have relatively complex or irregular surfaces. These surface voids may form discontinuities in a metal carbide layer formed from substrate 52 and permit oxidizing species to react with the underlying substrate 52. Antioxidant layer 56 may be formed by reacting a metal with both a surface portion of C/C composite substrate 52 and carbon powder packed into the surface voids, such that portions of antioxidant layer 56 may extend into and substantially fill surface voids, such as defects or pores, in the surface of substrate 52 and bridge with portions of antioxidant layer 56 on the remaining unreacted C/C composite substrate 52 to form a substantially continuous coating.

To form a uniform, defect-free coating, antioxidant layer 56 may include a metal carbide that is formed from both carbon matrix of a surface portion of C/C composite substrate 52 and carbon powder within the surface voids having a substantially same composition and morphology as the surface portion of C/C composite substrate 52. For example, prior to reaction with a metal, substrate 52 may include a surface portion (e.g., outer-most 10-20 microns) that includes carbon matrix capable of reacting with the metal to form a metal carbide. Without being limited to any particular theory, the carbon matrix of the surface portion may have a particular composition and/or morphology, such as micro-structure, phase composition, geometry of component phases, morphology of components phases, and/or dimensions and distribution of ceramic fibers or pores, crystal structure, presence and type of impurities, particle morphology shape and size, crystal surface terminations (e.g., active facets), crystal defects, and/or surface functionalization. This particular composition and/or morphology may result in a reaction with the metal according to particular reaction thermodynamics and kinetics, such as a temperature of reaction and a rate of reaction. By forming a metal carbide formed from both the carbon matrix of the C/C composite substrate 52 and carbon powder having a substantially same composition and/or morphology as C/C composite substrate 52, antioxidant layer 56 may be formed at substantially the same time and rate, thereby bridging metal carbide in the surface voids with metal carbide on unreacted C/C composite substrate 52.

High temperature article 50 may undergo relatively large temperature fluctuations, such that even relatively small differences in coefficients of thermal expansion (CTE) of materials of article 50 may generate thermal stresses. For example, a carbon composite of substrate 52 may have a CTE of about $1.0 \times 10^{-6}$ K$^{-1}$, while a silicon carbide of antioxidant layer 56 may have a CTE of about $4.7 \times 10^{-6}$ K$^{-1}$. As article 50 cools, the residual thermal stresses that result from the differences in CTE between substrate 52 and antioxidant layer 56 may induce defects in antioxidant layer

Figure 3A:
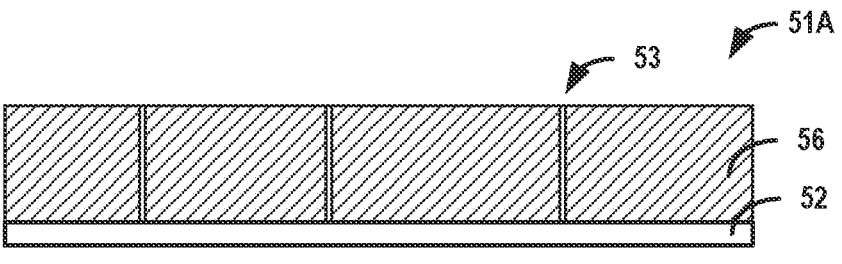
FIG. 3A is a cross-sectional side view diagram illustrating an example hybrid high temperature coating that includes multiple CTE microcracks, according to examples of the disclosure.

56, such as microcracks, holes, and spallation. FIG. 3A is a cross-sectional side view diagram illustrating an example high temperature article 51 at a relatively low temperature that includes multiple CTE microcracks 53 in antioxidant layer 56. These microcracks 53 may permit oxidizing agents to penetrate through antioxidant layer 56 and attack the underlying substrate 52.

Figure 3B:
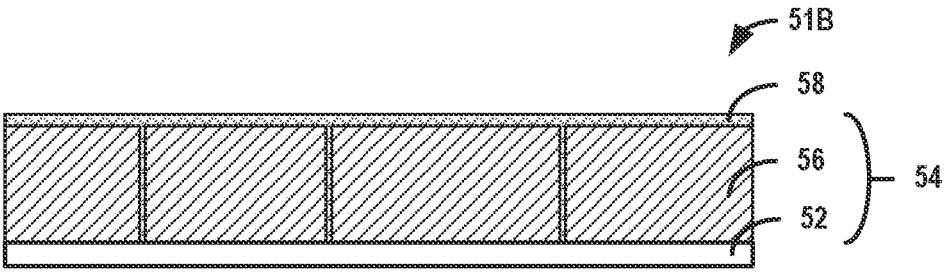
FIG. 3B is a cross-sectional side view diagram illustrating an example hybrid high temperature coating at a relatively low temperature that includes multiple CTE microcracks sealed by a low temperature sealant, according to examples of the disclosure.

To seal microcracks at relatively low temperatures, coating 54 includes a low temperature sealant 58 on a surface of high temperature antioxidant layer 56. Low temperature sealant 58 is configured to migrate into microcracks and solidify to seal the microcracks. FIG. 3B is a cross-sectional side view diagram illustrating an article 51B at a relatively low temperature having hybrid high temperature coating 54. In the example of FIG. 3B, antioxidant layer 56 includes multiple CTE microcracks 53, such as described in FIG. 3A above.

At low temperatures, low temperature sealant 58 may be present as a solid on a surface of antioxidant layer 56. At higher temperatures above a glass transition temperature, low temperature sealant 58 may flow into any microcracks 53 or other defects on the surface of antioxidant layer 56. As article 51B cools below the glass transition temperature, low temperature sealant 58 may solidify into an amorphous solid to seal microcracks 53. As a result, oxidizing agents may penetrate into microcracks 53 at a substantially reduced rate. Depending on a temperature of article 51B, low temperature sealant 58 may be in solid or liquid form.

Low temperature sealant 58 may be formed from a glass-forming soluble salt. Glass-forming soluble salts may include any salt that is soluble in a solvent, such as water, and capable of forming an amorphous glass that includes silicon dioxide (SiO$_2$). In some examples, low temperature sealant 58 includes an alkali or alkali earth silicate glass, such that low temperature sealant 58 includes silica gel. Alkali or alkali earth silicate glasses may include, but are not limited to, sodium silicate ((Na$_2$O)$_x$·(SiO$_2$)$_y$), potassium silicate, magnesium silicate, lithium silicate, or any combinations thereof. In some examples, the glass-forming soluble salt includes sodium silicate. Sodium silicate may be relatively inexpensive, be easily obtained, have a high thermal degradation temperature, and have a glass transition temperature and CTE configurable by a modifier and/or water content.

Low temperature sealant 58 may have a relatively high thermal degradation temperature. Such a high thermal degradation temperature may enable low temperature sealant 58 to remain on antioxidant layer 56 in a liquid state and subsequently solidify when article 50 cools. In some examples, low temperature sealant has a thermal degradation temperature greater than about 1200° C., such as greater than about 1650° C. In some examples, as will be described in FIG. 6 below, low temperature sealant 58 has a thermal degradation temperature that is greater than a metal oxide formation temperature, such that a metal oxide may provide a self-healing function if low temperature sealant 58 is heated above the thermal degradation temperature and begins to degrade.

Low temperature sealant 58 may be present on antioxidant layer 56 in an amount and coverage sufficient to fill microcracks that may be formed in antioxidant layer 56. For example, low temperature sealant 58 may form a layer having sufficient volume to fill microcracks that may be anticipated to be formed through the various thermal cycles experienced by the particular component. While a thickness of low temperature sealant 58 may vary, in a new state, low temperature sealant 58 may have a thickness between about 10 nanometers and one millimeter. In a liquid state, low temperature sealant 58 may have relatively high wettability on antioxidant layer 56. For example, the wettability of antioxidant layer 56 by the liquid amorphous glass of low temperature sealant 58 may be high enough that low temperature sealant 58 flows into microcracks 53.

Low temperature sealant 58 may have various thermal properties that enable it to effectively migrate into and seal microcracks 53, including glass transition temperature and CTE. For example, the glass transition temperature of low temperature sealant 58 may be selected based on an anticipated temperature range experienced by article 50. The glass transition temperature may be a temperature or temperature range at which low temperature sealant 58 transitions from an amorphous solid to a liquid capable of flowing into microcracks, and transitions from a liquid in the microcracks and/or on antioxidant layer 56 to an amorphous solid within microcracks 53 and/or on antioxidant layer 56. For example, a composition of low temperature sealant 58 may be selected for a glass transition temperature that balances the mobility of low temperature sealant 58 for filling microcracks with the protection of low temperature sealant 58 as an amorphous solid sealing microcracks.

In some examples, low temperature sealant 58 may be configured to have a relatively high CTE. For example, low temperature sealant 58 that is applied at a relatively low temperature may first form a salt. As article 50 heats up but prior to the salt melting, low temperature sealant may expand in microcracks to seal the microcracks, such that a relatively high CTE may better seal the microcracks. In some examples, low temperature sealant 58 may be configured to have a relatively low CTE. For example, low temperature sealant 58 that is applied at a high temperature in a liquid state may flow into the microcracks and solidify, such that a relatively low CTE may better seal the microcracks during cooling.

Figure 3C:
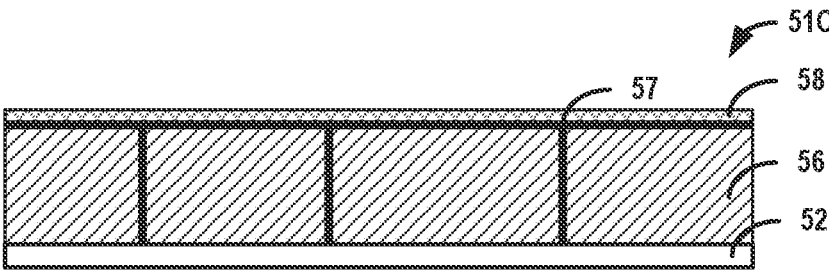
FIG. 3C is a cross-sectional side view diagram illustrating an example hybrid high temperature coating at a relatively high temperature that includes multiple CTE microcracks sealed by a metal oxide, according to examples of the disclosure.

In some examples, antioxidant layer 56 is a metal-rich antioxidant layer. FIG. 3C is a cross-sectional side view diagram illustrating an example high temperature coating at a relatively high temperature that includes multiple CTE microcracks sealed by a metal oxide layer 57, according to examples of the disclosure. In examples in which antioxidant layer 56 includes a metal carbide, after operation or firing at high temperatures, coating 54 may include an outer layer of a metal oxide on high temperature antioxidant layer 56 that seals the microcracks at relatively high temperatures. Antioxidant layer 56 may be metal-rich, such that metal-rich antioxidant layer 56 may include a metal carbide having metal in stoichiometric excess. During operation of article 50, the excess metal may form a metal oxide that forms on surfaces of a defect to form a passivation layer, such as an metal oxide layer 57 described below, and/or may fill small cracks or pores in metal-rich antioxidant layer 56 caused by a difference in coefficient of thermal expansion between substrate 52 and metal-rich antioxidant layer 56, such as by expanding through oxidation of the excess metal at high temperatures in the presence of oxidation during operation. As a result, the metal of metal-rich antioxidant layer 56 may perform a passivation and/or self-healing function to further protect substrate 52. Metal oxide layer 57 may have a relatively high temperature resistance, such as greater than about 1500° C. In this way, metal oxides may form a further protective layer to protect substrate 52 from oxidation at high temperatures, such as temperatures above a glass transition temperature of low temperature sealant 58 or a temperature above a thermal degradation temperature of low temperature sealant 58.

While metal oxide layer 57 may seal microcracks at high temperatures, the metal may not oxidize at lower temperatures, such that microcracks in antioxidant layer 56 may not be sealed by the metal oxide. For example, silicon dioxide may not form until about 800° C., leaving microcracks exposed to oxidizing species at temperature less than about 800° C. As such, metal oxide layer 57 may be paired with low temperature sealant 58 to provide sealing of microcracks at both high and low temperatures.

Figure 4:
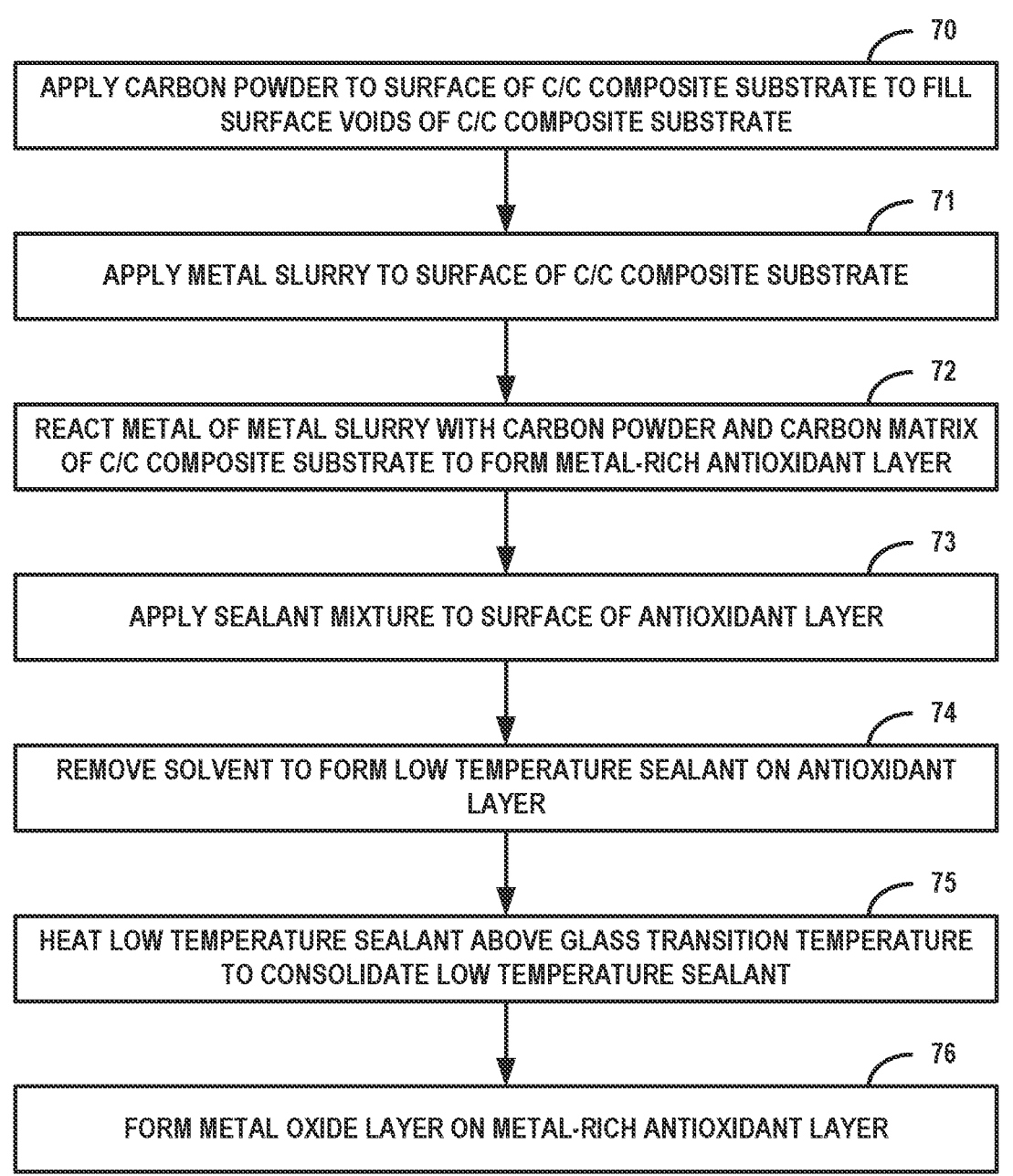
FIG. 4 is a flow diagram illustrating an example technique for forming a hybrid high temperature coating, according to examples of the disclosure.

Hybrid high temperature coatings described herein, such as coating 54 of FIG. 2 above, may be formed on C/C composite substrates. FIG. 4 is a flow diagram illustrating an example technique for forming a hybrid high temperature coating, according to examples of the disclosure. The example technique of FIG. 4 will be described with respect to FIGS. 5A-5G, which illustrate various steps for forming high temperature antioxidant layers.

In some examples, the method of FIG. 4 may include forming antioxidant layer 56 on C/C composite substrate 52. Antioxidant layer 56 may be a metal carbide antioxidant layer. Antioxidant layer 56 may be formed by a variety of processes including, but not limited to, chemical vapor deposition (CVD), plasma-enhanced CVD, pack cementation, melt infiltration, polymer pyrolysis, direct chemical reaction between carbon and a molten metal, such as silicon, or any other method for forming antioxidant layer 56 on substrate 52.

Figures 5A, 5B, 5C, 5D:
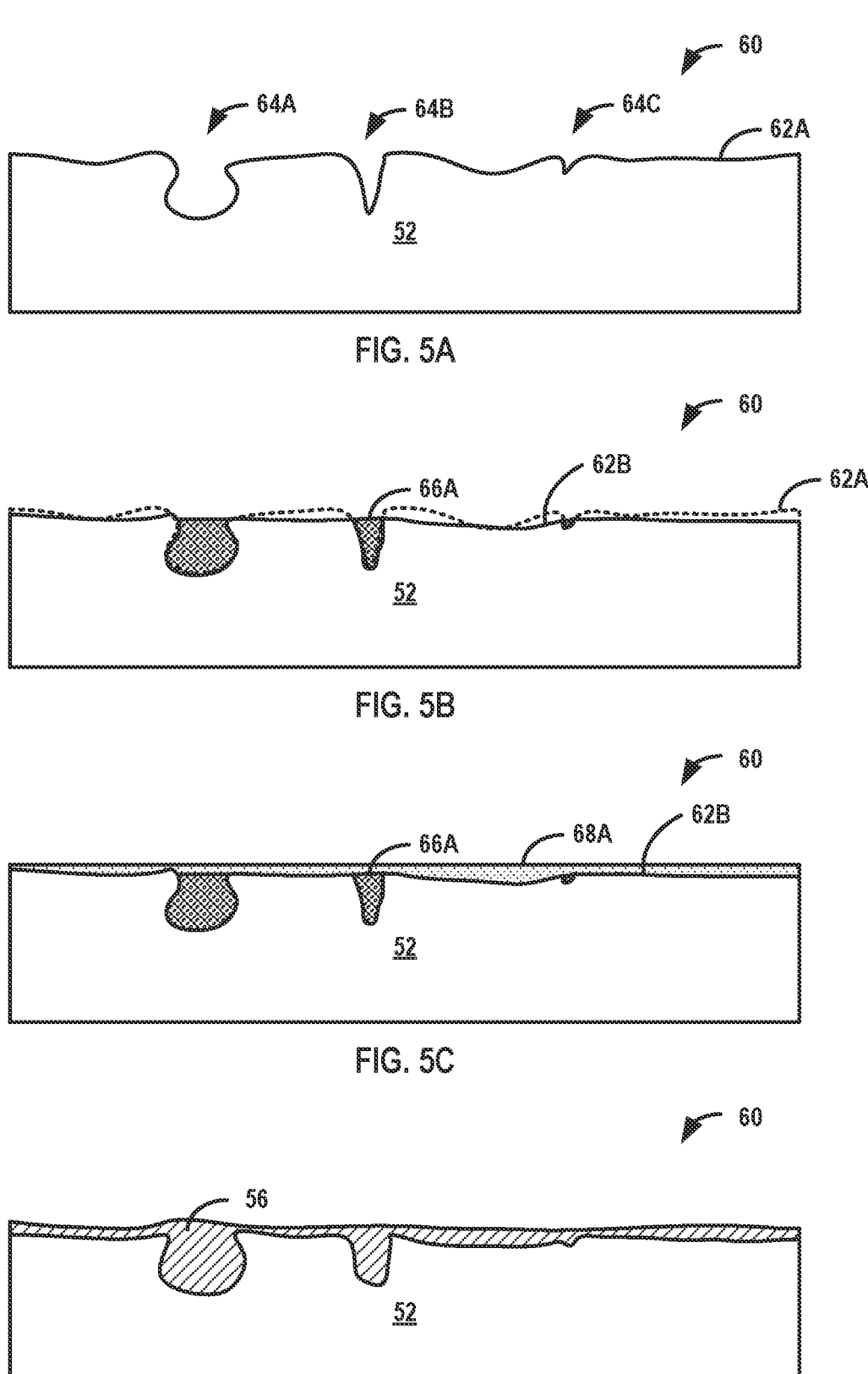
FIG. 5A is a cross-sectional side view diagram illustrating a portion of an example C/C composite substrate that includes surface voids, according to examples of the disclosure.
FIG. 5B is a cross-sectional side view diagram illustrating the portion of the example C/C composite substrate of FIG. 5A with carbon powder filling the surface voids, according to examples of the disclosure.
FIG. 5C is a cross-sectional side view diagram illustrating the portion of the example C/C composite substrate of FIG. 5A with carbon powder filling surface voids and a metal slurry on the C/C composite substrate, according to examples of the disclosure.
FIG. 5D is a cross-sectional side view diagram illustrating the portion of the example C/C composite substrate of FIG. 5A and an antioxidant layer, according to examples of the disclosure.

In some examples, antioxidant layer 56 may be formed in situ on C/C composite substrates to form denser coatings that may continuously encapsulate the C/C composite substrate. As described above with respect to substrate 52 of FIG. 2, substrate 52 may include various surface voids that, if left unsealed or partially sealed, may permit oxidizing species to penetrate into and react with substrate 52. FIG. 5A is a cross-sectional side view diagram illustrating a portion 60 of an example C/C composite substrate 52, according to examples of the disclosure. Substrate 52 defines an initial outer surface 62A. Surface 62A includes one or more surface voids 64A, 64B, 64C (individually "void 64" and collectively "voids 64"). Voids 64 may include any irregularity or deviation from a general plane of surface 62A that may otherwise produce a discontinuity in a metal carbide coating formed from the surface portion of substrate 52 unless filled. In some examples, voids 64 may include one or more pores 64A, one or more cracks 64B, and/or one or more surface projections or depressions 64C. These voids 64 may be formed during formation of substrate 52, and manufacturing efforts to reduce voids 64 may be relatively expensive. Voids 64 may have relatively complex surfaces that define relatively complex volumes that may be difficult to fill. For example, relatively large reactant particle size and/or high slurry viscosity may limit penetration of metal reactants into voids 64.

Referring back to FIG. 4, the example technique may include applying carbon powder to a surface of a carbon/carbon (C/C) composite substrate to fill surface voids of the C/C composite substrate (70). Applying the carbon powder to the surface may include coating the surface of the C/C composite substrate with the carbon powder and forcing the carbon powder into one or more surface voids of the surface of the C/C composite substrate. FIG. 5B is a cross-sectional side view diagram illustrating portion 60 of the example C/C composite substrate 52 of FIG. 5A with a carbon powder 66A filling surface voids 64, according to examples of the disclosure. Applying carbon powder 66A to a surface 62B may include distributing carbon powder 66A on surface 62B and forcing carbon powder 66A into one or more voids 64 of surface 62B (e.g., to pack or at least partially fill the surface voids with powder). As a result, carbon powder 66A may penetrate into voids 64.

Carbon powder 66A may have a substantially same composition and morphology as a surface portion of C/C composite substrate 52 at or near surface 62B. For example, the microstructure and/or crystallinity of carbon powder 66A may be substantially the same as the microstructure and/or crystallinity of material of substrate 52 near surface 62B and voids 64. Carbon powder 66A having a substantially same composition and morphology as the surface portion of C/C composite substrate 52 may have a substantially same reaction thermodynamics and kinetics as the surface portion of C/C composite substrate 52, such that reaction of an infiltrated metal with carbon powder 66A and carbon matrix of a surface portion of C/C composite substrate 52 may occur at substantially the same temperature and substantially the same rate. As explained above, reaction thermodynamics and kinetics of each of carbon powder 66A and the carbon matrix of C/C composite substrate 52 may be a product of a respective type, feedstock source, processing history, and other properties and conditions of carbon powder 66A and C/C composite substrate 52 that influence a temperature and rate at which carbon powder 66A and the carbon matrix of C/C composite substrate 52 may react with an infiltrated metal.

In some examples, applying carbon powder 66A to surface 62B of substrate 52 may include applying carbon powder 66A as a separate powder in a slurry or mixture to surface 62B of substrate 52. As one example, carbon powder 66A may be ground from one or more portions of substrate 52 and/or from feedstock similar in composition and/or morphology to substrate 52 and applied to surface 62B. For example, during processing of C/C composite substrate 52, carbon powder may be produced through various abrasive or other operations. This carbon powder may be further processed, such as by milling, to produce carbon powder 66A having a similar processing history as C/C composite substrate 52. As another example, carbon powder 66A may be selected or obtained having a composition and/or morphology that substantially matches the composition and/or morphology of the surface portion of substrate 52 and applied to surface 62. For example, carbon powder 66A may be selected or obtained from a feedstock produced under similar processing conditions as C/C composite substrate 52.

In some examples, applying carbon powder 66A to surface 62B of substrate 52 may include applying a force to surface 62B to force and pack carbon powder 66A into voids 64. For example, the force may include a normal force to surface 62B and/or any lateral forces to spread and/or fill voids 64. The force applied to carbon powder 66A may force carbon powder 66A into surface voids 64 prior to forming a metal carbide and pack carbon powder 66A into surface voids 64, such that carbon powder 66A is retained in surface voids 64, such as up to between about 50 vol. % and about 60 vol. % packing. In some instances, a carrier medium may be applied to carbon powder 66A, such as a volatile medium to aid in dispersing carbon powder 66A into voids 64. For example, carbon powder 66A may be dispersed in the carrier medium to form a slurry corresponding to a relatively high packing. A variety of methods may be used to force and pack carbon powder 66A into surface voids 64 including, but not limited to: rotary forces, such as polishing or abrasion; linear forces, such as spackling; manual forces, such as manual sanding (e.g., to generate and force carbon powder 66A); and the like.

In some examples, such as illustrated in FIG. 5B, applying carbon powder 66A to surface 62B of C/C composite substrate 52 may include generating carbon powder 66A directly from substrate 52 by mechanically abrading surface 62A of C/C composite substrate 52. In the example of FIG. 5B, substrate 52 has been abraded to surface 62B from surface 62A, as indicated by the dashed line. For example, rather than separately apply carbon powder 66A, which may be difficult to match to substrate 52, and force carbon powder 66A in a separate step, abrading surface 62A may both generate carbon powder 66A having a substantially same composition and/or morphology as substrate 52 and force carbon powder 66A into voids 64 in a single step. Even within substrate 52, a composition and/or morphology may vary, such as due to different temperatures during formation of substrate 52, such that directly obtaining carbon powder 66A from portions of substrate 52 near surface 62 may generate carbon powder that matches the composition and/or morphology of the material around voids 64. The resulting carbon powder 66A may have an identical composition and morphology as substrate 52 near surface 62B, may be generated proximate to voids 64, and may penetrate into voids 64 without the use of a carrier medium.

Excess carbon powder 66A may be removed from surface 62 prior to reaction with the metal of a metal slurry or mixture, such that surface voids 64 may include carbon powder 66A while low curvature or planar surfaces of surface 62B may not include carbon powder 66A. For example, if carbon powder 66A remains on low curvature or planar portions of surface 62B and is subsequently reacted with a metal, a resulting metal carbide may not strongly adhere to a surface of C/C composite substrate 52, and may be subject to delamination. In some examples, excess carbon powder 66A may be removed from non-void surfaces of surface 62B during packing of carbon powder 66A, such as by polishing surface 62B to force carbon powder 66A into voids 64 while wiping away carbon powder 66A on low curvature or planar surfaces of surface 62B.

Referring back to FIG. 4, the example technique may include applying a metal slurry to the surface of the C/C composite substrate (71). FIG. 5C is a cross-sectional side view diagram illustrating portion 60 of the example C/C composite substrate 52 of FIG. 5A with carbon powder 66A filling voids 64 and a metal slurry 68A on C/C composite substrate 52, according to examples of the disclosure. While illustrated as a metal slurry 68A, the metal may be applied in any form, including as a liquid or gas.

Metal slurry 68A may include metal particles in an application medium. In some examples, the metal particles of metal slurry 68A include at least one of silicon, titanium, or tungsten. The metal particles may be coated by a thin layer of a metal oxide, such as may be formed in an oxidizing atmosphere during formation or shelf-life of the metal particles. For example, a relatively pure feedstock of metal particles may be prohibitively expensive due to inert storage, such that use of metal particles that include a metal oxide film may broaden available feedstocks of material for the metal particles and/or reduce a cost of the metal particles.

Referring back to FIG. 4, the example technique may include reacting a metal of the metal slurry with carbon of the carbon powder and carbon of the surface portion of the C/C composite substrate to form an antioxidant layer of a metal carbide on the C/C composite substrate (72). FIG. 5D is a cross-sectional side view diagram illustrating portion 60 of the example C/C composite substrate 52 of FIG. 5A and an antioxidant layer 56A, according to examples of the disclosure. To react the metal of metal slurry 68A with the carbon of carbon powder 66A and the carbon of the surface portion of C/C composite substrate 52, the metal may be fluidized (e.g., melted or sublimated) such that the metal may infiltrate into carbon powder 66A and the surface portion of C/C composite substrate 52 and react with carbon of carbon powder 66A and carbon matrix of the surface portion of C/C composite substrate 52 to form a metal carbide. This metal carbide may form a continuous antioxidant layer 56A to substantially seal C/C composite substrate 52.

In some instances, this reaction may be limited by diffusion of the metal into the surface portion of C/C composite substrate 52 and carbon powder 66A. As the metal reacts with the surface portion of C/C composite substrate 52 and forms a metal carbide, the newly formed metal carbide may form a diffusion barrier separating the reactants (e.g., carbon and metal), which may stop the thickening and further creation to form thicker metal carbides (e.g., by preventing metal from further penetrating into a depth of the surface portion of C/C composite substrate 52 and/or preventing diffusion of carbon out of C/C composite substrate 52 to react with the metal). On the other hand, as the metal reacts with carbon powder 66A and forms a metal carbide, the powder form of carbon powder 66A may permit the metal to continue to infiltrate around carbon powder 66A, such that a thickness of metal carbide in surface voids 64 may be greater than a thickness of metal carbide on C/C composite substrate 52. In some examples, a size of carbon powder 66A may correspond to a size for which the metal may infiltrate and react (e.g., less than a diffusion limit), such as less than about 20 micrometers (m), or between about 1 μm and about 5 μm. In contrast, a size of surface voids 64 may be greater than about 100 μm, such as between about 100 μm and about 1000 μm. The metal may be applied to surface 62B of C/C composite substrate 52 until the reaction ends either by diffusion limitation, metal evaporation or exhaustion, or both. For example, any remaining metal on surface 62 may be removed, such as through evaporation. The resulting layer 56A may be a relatively homogeneous metal carbide having a relatively uniform thickness that may include some deviations to fill voids 64. In some examples, a thickness of antioxidant layer 56A at a surface of C/C composite substrate 52 is less than about 50 microns, such as between about 10 microns and about 20 microns. In some examples, a thickness of antioxidant layer 56A in surface voids 64 may be substantially thicker than the thickness of antioxidant layer 56A at the surface of C/C composite substrate 52.

Reaction of the metal of metal slurry 68A with carbon of carbon powder 66A and carbon matrix of the surface portion of C/C composite substrate 52 may be performed under stoichiometric excess of the metal, such that the resulting metal carbide antioxidant layer 56 is metal-rich. Metal-rich may include a metal carbide phase that includes excess free metal. For example, a metal-rich metal carbide phase may include a stoichiometric ratio of the metal to the carbon of the carbon powder that is greater than 1.1, such as greater than about 1.001:1. By performing the reaction at stoichiometric excess of the metal, the resulting metal-rich antioxidant layer 56A may include excess metal. During formation of metal-rich antioxidant layer 56A or during operation of substrate 52 (e.g., as a component), the excess metal may form a metal oxide. In some instances, such as will be described in FIG. 5G, the metal oxide may form a passivation layer that further protects substrate 52. In some instances, the metal oxide may perform a self-healing function for metal-rich antioxidant layer 56A. For example, the metal oxide may migrate into small cracks that may form during operation, such as due to mismatch in CTE or volumetric expansion, and seal the cracks.

In some examples, reacting the metal of metal slurry 68A with the carbon of carbon powder 66A may include heating surface 62 of substrate 52 above a melting point of the metal and maintaining a vapor pressure of the metal at surface 62 of substrate 52 in stoichiometric excess. A variety of parameters, such as a temperature at surface 62, a concentration (e.g., as indicated by pressure) of the metal at surface 62, and a time of reaction, may be controlled to maintain the metal at stoichiometric excess and encourage migration of the metal into, and reaction with, carbon powder 66A and carbon of the surface portion of C/C composite substrate 52. As one example, for a metal of silicon, the temperature may be maintained at greater than about 1400° C., the pressure may be maintained between about 0.1 mTorr and about 300 mTorr, and the temperature and pressure may be maintained for greater than about one hour.

In some instances, the resulting antioxidant layer 56 may still include one or more surface voids. As one example, a surface void in the C/C composite substrate may be substantially large that the carbon powder in the surface void may not react at a same time, resulting in smaller remaining surface voids. As another example, a surface void in antioxidant layer 56 may extend to a surface of the C/C composite substrate, such as due to pinholes in antioxidant layer 56. To fill surface defects 64D and 64E, the method of FIG. 4 may include patching one or more surface voids remaining on the C/C composite substrate and/or surface voids created while forming the antioxidant layer. Such patching may be repeated for multiple iterations to form a continuous, substantially defect-free antioxidant layer 56, and may include additional processing steps such as cleaning or brushing antioxidant layer 56A such that any loose carbides or carbon powder is removed prior to additional coatings. Further details may be described in U.S. patent application Ser. No. 17/303,643, entitled "HIGH TEMPERATURE METAL CARBIDE COATINGS" and filed Jun. 3, 2021, and is incorporated herein by reference in its entirety.

Figure 5E:
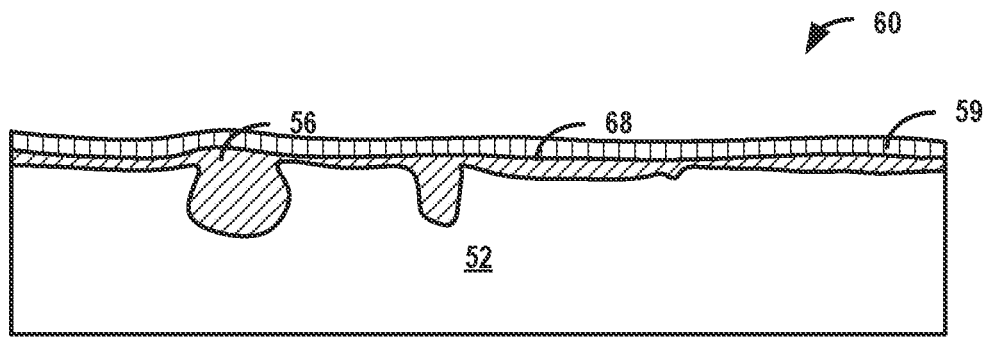
FIG. 5E is a cross-sectional side view diagram illustrating the portion of the example C/C composite substrate of FIG. 5A, an antioxidant layer, and a low temperature sealant mixture, according to examples of the disclosure.

Referring back to FIG. 4, regardless of how antioxidant layer 56 is formed on substrate 52, the example technique includes applying a sealant mixture to a surface of a high temperature antioxidant layer on a carbon/carbon (C/C) composite substrate (73). FIG. 5E is a cross-sectional side view diagram illustrating the portion of the example C/C composite substrate of FIG. 5A, an antioxidant layer 56, and a low temperature sealant mixture 59, according to examples of the disclosure. Sealant mixture 59 may be applied to a surface 68 of antioxidant layer 56 using any of a variety of processes including, but not limited to, immersion, dip coating, spray coating, brush coating, or any other process that may distribute the sealant mixture on the surface of antioxidant layer 56.

The sealant mixture 59 includes a glass-forming soluble salt in a solvent. Glass-forming soluble salts may include any salt that is soluble in the solvent, such as water, and capable of forming an amorphous glass upon drying that includes silicon dioxide ($SiO_2$). In some examples, sealant mixture 59 may include an alkali or alkali earth silicate salt, such that the resulting low temperature sealant 58 includes silica gel. Alkali or alkali earth silicate salts may include, but are not limited to, sodium silicate ($(Na_2O)_x \cdot (SiO_2)_y$), potassium silicate, magnesium silicate, lithium silicate, or any combinations thereof. In some examples, the glass-forming soluble salt includes sodium silicate. In some examples, sealant mixture 59 may include a polymer that burns off to silica, such as tetraethyl orthosilicate. Sealant mixture 59 may include the glass-forming soluble salt in any concentration up to saturation of the salt in the solvent. The solvent may include any solvent capable of dissolving the glass-forming salts.

In some examples, the identity and composition of the glass-forming soluble salts in sealant mixture 59 may be selected to provide a desired CTE and/or glass transition temperature to low temperature sealant 58. Such composition may include both an identity of a modifier and a proportion of the modifier to silica. As one example, for a particular molar composition, sodium silicate may have a higher CTE and a higher glass transition temperature than lithium silicate. As another example, for a glass-forming soluble salt that includes sodium silicate ($(Na_2O)_x \cdot (SiO_2)_y$), a proportion of $Na_2O$ to $SiO_2$ may be selected to produce a desired CTE or glass transition temperature of the resulting glass. For example, for a silicate glass, a glass transition temperature of the glass may decrease as a concentration of modifiers, such as $Na_2O$, increases, while a CTE of the glass may increase as a concentration of modifiers, such as $Na_2O$, increases.

Figure 5F:
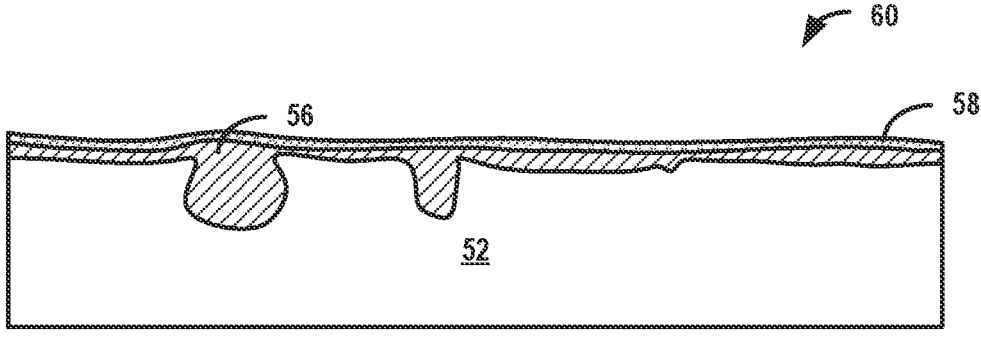
FIG. 5F is a cross-sectional side view diagram illustrating the portion of the example C/C composite substrate of FIG. 5A, an antioxidant layer, and a low temperature sealant, according to examples of the disclosure.

Referring back to FIG. 4, the example technique includes removing the solvent to form a low temperature sealant from the glass-forming soluble salt on the high temperature antioxidant layer (74). FIG. 5F is a cross-sectional side view diagram illustrating the portion of the example C/C composite substrate of FIG. 5A, an antioxidant layer, and a low temperature sealant, according to examples of the disclosure. The solvent may be removed by any of a variety of low temperature drying processes. In some examples, the solvent may be removed to such a degree that low temperature sealant 58 is disposed on surface 68 of antioxidant layer 56 as a solid at low temperature. Such a solid may not be fully consolidated, and may be present as a loose deposit of precipitated glass-forming salts. Such salts may be consolidated once article 60 has been brought above the glass transition temperature of low temperature sealant 58.

Referring back to FIG. 4, in some examples, the example technique may include heating the low temperature sealant above the glass transition temperature to consolidate the low temperature sealant (75), such that subsequent cooling may form a dense, amorphous glass. This heating may not be a post-treatment step, but may be part of normal operation of article 60, such as a braking operation. As such, low temperature sealant 58 may form a sealant layer on antioxidant layer 56 without any specific heat treatment step.

In some instances, the low temperature sealant may degrade or otherwise be removed from surface 68 of antioxidant layer 56, and stop providing sufficient protection. In such instances, steps 74-76 of FIGS. 5E and 5F may be repeated to renew low temperature sealant 58. In other examples, the example technique of FIG. 4 may include only steps 74-76 as a treatment for an existing antioxidant coating 56.

Figure 5G:
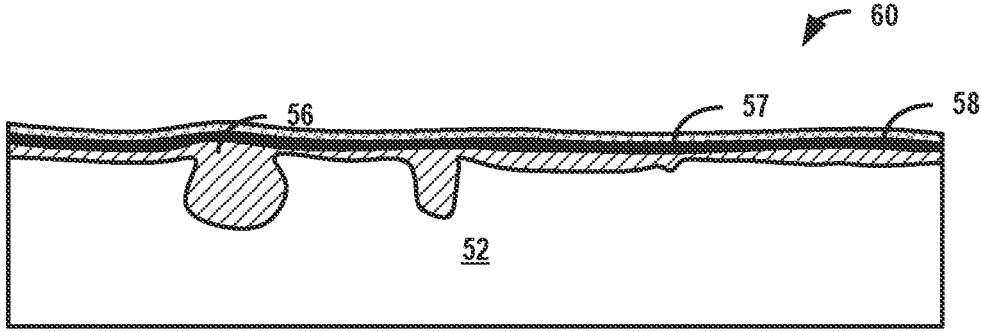
FIG. 5G is a cross-sectional side view diagram illustrating the portion of the example C/C composite substrate of FIG. 5A, an antioxidant layer, a low temperature sealant, and an outer oxide layer, according to examples of the disclosure.

Referring back to FIG. 4, in some examples, the example technique includes forming a metal oxide layer on the high temperature antioxidant layer (76). FIG. 5G is a cross-sectional side view diagram illustrating the portion of the example C/C composite substrate of FIG. 5A, an antioxidant layer 56, a low temperature sealant 58, and a metal oxide layer 57, according to examples of the disclosure. Metal slurry 68A of FIG. 4C may include metal particles coated by a layer of a metal oxide, such a silicon dioxide, titanium oxide, and/or tungsten oxide. During heating of surface 62, at least a portion of the metal oxide from the metal particles may go into solution and migrate from metal slurry 68A to a surface of the metal-rich antioxidant layer 56. Upon cooling, the metal oxide may form metal oxide layer 57 of the metal oxide on the metal-rich antioxidant layer 56. In some examples, rather than or in addition to forming metal oxide layer 57, at least a portion of the metal oxide may remain in metal-rich antioxidant layer 56, such that, during operation of a component that includes substrate 52, the metal oxide may be available to migrate to one or more cracks formed in metal-rich antioxidant layer 56. As a result, metal oxide layer 57 may seal microcracks at temperatures at which low temperature sealant 58 may be a liquid or degraded.

In some examples, low temperature sealant 58 may form at least part of metal oxide layer 57. For example, low temperature sealant 58 may include a metal oxide, such as silicon oxide, as part of its composition. Upon degradation, low temperature sealant 58 may degrade to form silica. In examples in which the metal oxide layer 57 includes silicon oxide, degraded low temperature sealant 58 and metal oxide layer 57 may form a dense metal oxide coating on antioxidant layer 56.

Low temperature sealant 58, and in some instances metal oxide layer 57, may be configured to provide protection against oxidizing agents over a wide range of temperatures. In some examples, low temperature sealant 58 may have thermal properties, including thermal degradation temperature and glass transition temperature, that may be selected to seal microcracks and maintain thermal integrity over a desired range of operating temperatures.

Figure 6:
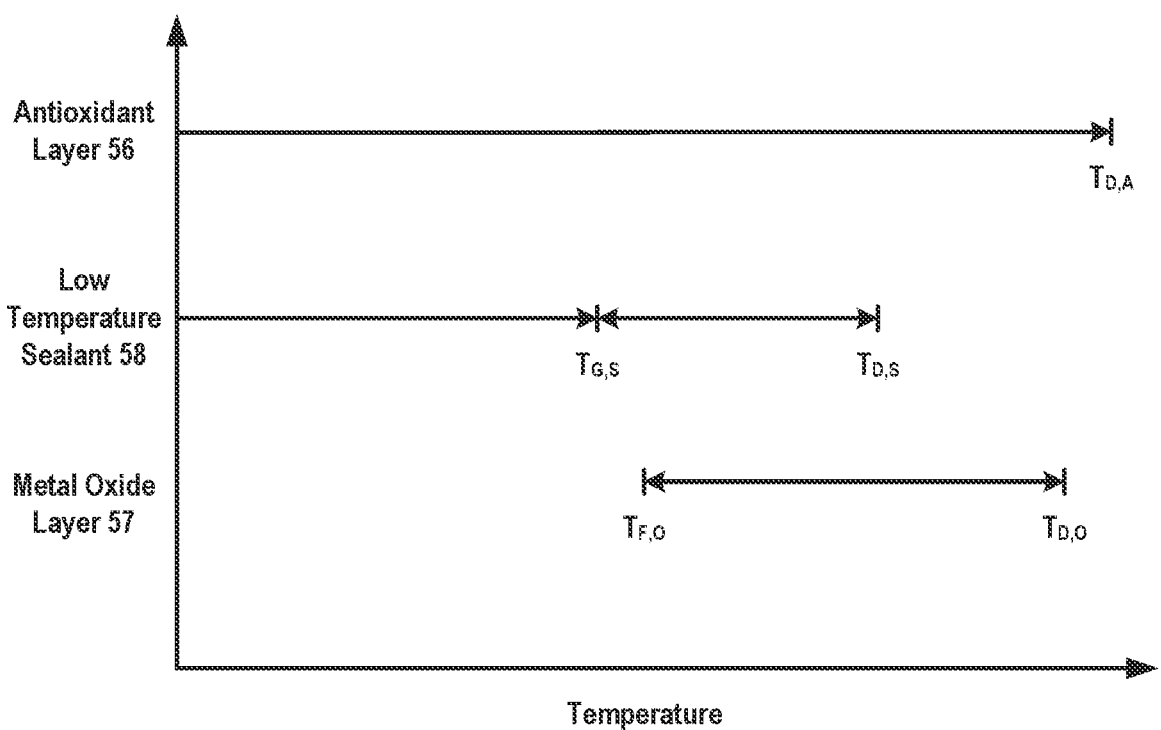
FIG. 6 is a graph of an example relationship between various temperature events of an antioxidant layer, a low temperature sealant, and a metal oxide layer, according to examples of the disclosure.

FIG. 6 is a graph of an example relationship between various temperature events of an antioxidant layer 56, a low temperature sealant 58, and a metal oxide layer 57, according to examples of the disclosure. Antioxidant layer 56 may have a thermal degradation temperature ($T_{D,A}$) that is relatively high, such that antioxidant layer 56 may provide some protection to the underlying substrate at high temperatures. Low temperature sealant 58 transitions from a solid to a liquid, and vice versa, at a glass transition temperature (or range) ($T_{G,S}$), and thermally degrades at a thermal degradation temperature ($T_{D,S}$).

In some examples, the glass transition temperature ($T_{G,S}$) of low temperature sealant 58 may be sufficiently low that low temperature sealant 58 remains in a liquid state over a large temperature range. By remaining as a liquid over a larger temperature range, low temperature sealant 58 may flow into a larger number of microcracks or other defects that may form during cooling, thereby providing greater protection. In some examples, the glass transition temperature ($T_{G,S}$) of low temperature sealant 58 may be sufficiently high that low temperature sealant remains in a solid state over a large temperature range. By remaining as a solid over a larger temperature range, low temperature sealant 58 may provide a static, robust seal of the defects in antioxidant layer 56. As described above, the glass transition temperature of low temperature sealant 58 may be configured through selection of the glass-forming soluble salts, such as selection of a glass modifier or proportion of glass modifier to silica.

In some examples, the thermal degradation temperature ($T_{D,S}$) of low temperature sealant 58 may be sufficiently high to remain on antioxidant layer 56 through a desired operating range of antioxidant layer 56. For example, as described above, low temperature sealant 58 may remain on antioxidant layer 56 in a liquid state at high temperatures and solidify when cooled below the glass transition temperature.

By operating at temperature below the thermal degradation temperature of low temperature sealant 58, the low temperature sealant 58 may be available for sealing microcracks that may form when antioxidant layer 56 cools to a lower temperature.

In some examples, metal oxide layer 57 may further provide protection to antioxidant layer 56 at high temperatures. Metal oxide layer 57 may have a formation temperature ($T_{F,O}$) at which excess metal in antioxidant layer 56 forms an oxide, and may thermally degrade at a thermal degradation temperature ($T_{D,O}$). In some instances, the thermal degradation temperature ($T_{D,O}$) of metal oxide layer 57 may be higher than the thermal degradation temperature ($T_{D,A}$) of antioxidant layer 56, such that the component may continue to operate at temperatures above which antioxidant layer 56 would typically break down and expose the underlying substrate to oxidation. In some examples, the formation temperature ($T_{F,O}$) of the oxide layer 57 may be sufficiently low that metal oxide layer 57 forms before the component reaches the thermal degradation temperature ($T_{D,S}$) of low temperature sealant 58. By forming metal oxide layer 57 prior to low temperature sealant 58 degrading, metal oxide layer 57 may protect antioxidant layer 56 and the underlying substrate. Low temperature sealant 58 may be reapplied to a surface of metal oxide layer 57 or antioxidant layer 56.

Example 1: A method for forming a hybrid coating includes applying a sealant mixture to a surface of a high temperature antioxidant layer on a carbon/carbon (C/C) composite substrate, wherein the sealant mixture comprises a glass-forming soluble salt in a solvent; and removing the solvent to form a low temperature sealant from the glass-forming soluble salt on the high temperature antioxidant layer.

Example 2: The method of example 1, wherein the surface of the high temperature antioxidant layer includes a plurality of microcracks, and wherein the low temperature sealant fills at least a portion of the plurality of microcracks.

Example 3: The method of any of examples 1 and 2, wherein the low temperature sealant has a thermal degradation temperature greater than about 1200° C.

Example 4: The method of any of examples 1 through 3, wherein the glass-forming soluble salt comprises sodium silicate, and wherein the low temperature sealant comprises silica gel.

Example 5: The method of any of examples 1 through 4, wherein the high temperature antioxidant layer comprises a metal carbide.

Example 6: The method of example 5, wherein the metal carbide comprises at least one of silicon carbide, titanium carbide, or tungsten carbide.

Example 7: The method of any of examples 5 and 6, further comprising forming an outer layer of a metal oxide on the high temperature antioxidant layer.

Example 8: The method of any of examples 5 through 7, further comprising, prior to forming the hybrid coating, forming the antioxidant layer on the C/C composite substrate using at least one of chemical vapor deposition, plasma-enhanced chemical vapor deposition, pack cementation, melt infiltration, polymer pyrolysis, or direct chemical reaction between carbon and a molten metal.

Example 9: The method of example 8, further includes applying carbon powder to a surface of the carbon/carbon (C/C) composite substrate to force the carbon powder into one or more surface voids of the surface of the C/C composite substrate, wherein the carbon powder has a substantially same composition and morphology as a surface portion of the C/C composite substrate; applying a metal slurry to the surface of the C/C composite substrate following the application of the carbon powder; and reacting a metal of the metal slurry with carbon of the carbon powder and carbon of the surface portion of the C/C composite substrate to form the antioxidant layer of a metal carbide on the C/C composite substrate.

Example 10: The method of example 9, wherein the metal carbide includes a stoichiometric ratio of a metal carbide phase of the metal to the carbon of the carbon powder that is greater than 1:1.

Example 11: A high temperature article includes a carbon/carbon (C/C) composite substrate; and a hybrid coating on the C/C composite substrate, wherein the hybrid coating comprises: a high temperature antioxidant layer on a surface of the C/C composite substrate; and a low temperature sealant on a surface of the high temperature antioxidant layer, wherein the low temperature sealant is formed from a glass-forming soluble salt.

Example 12: The article of example 11, wherein the surface of the high temperature antioxidant layer includes a plurality of microcracks, and wherein the low temperature sealant fills at least a portion of the plurality of microcracks.

Example 13: The article of any of examples 11 and 12, wherein the low temperature sealant has a thermal degradation temperature greater than about 1200° C.

Example 14: The article of any of examples 11 through 13, wherein the glass-forming soluble salt comprises sodium silicate, and wherein the low temperature sealant comprises silica gel.

Example 15: The article of any of examples 11 through 14, wherein the high temperature antioxidant layer comprises a metal carbide.

Example 16: The article of example 15, wherein the metal carbide comprises at least one of silicon carbide, titanium carbide, or tungsten carbide.

Example 17: The article of any of examples 15 and 16, further comprising an outer layer of a metal oxide on the high temperature antioxidant layer.

Example 18: The article of any of examples 15 through 17, wherein a thickness of the high temperature antioxidant layer is less than about 30 micrometers.

Example 19: The article of any of examples 15 through 18, wherein the metal carbide of the high temperature antioxidant layer is formed from carbon of a carbon powder and carbon of a surface portion of the C/C composite substrate, wherein the carbon powder has a substantially same composition and morphology as the surface portion of the C/C composite substrate, and wherein the high temperature antioxidant layer extends into one or more surface voids of the surface of the C/C composite substrate.

Example 20: The article of example 19, wherein the metal carbide includes a stoichiometric ratio of a metal carbide phase of the metal to the carbon of the carbon powder that is greater than 1:1.

Various examples have been described. These and other examples are within the scope of the following claims.

What is claimed is:
1. A method for forming a hybrid coating, comprising:
  forming a high temperature antioxidant coating on a carbon/carbon (C/C) composite substrate via reactive slurry melt infiltration, wherein the high temperature antioxidant coating formed via the reactive slurry melt infiltration includes excess free metal;

applying a sealant mixture to a surface of the high temperature antioxidant coating, wherein the sealant mixture comprises a glass-forming soluble salt in a solvent; and removing the solvent to form a low temperature sealant from the glass-forming soluble salt on the high temperature antioxidant coating; and forming an outer layer of a metal oxide on the high temperature antioxidant coating, wherein the metal oxide is formed from the excess free metal.

2. The method of claim 1, wherein the surface of the high temperature antioxidant coating includes a plurality of microcracks, and wherein the low temperature sealant fills at least a portion of the plurality of microcracks.

3. The method of claim 1, wherein the low temperature sealant has a thermal degradation temperature greater than about 1200° C.

4. The method of claim 1, wherein the glass-forming soluble salt comprises sodium silicate, and wherein the low temperature sealant comprises silica gel.

5. The method of claim 1, wherein the high temperature antioxidant coating comprises a metal carbide.

6. The method of claim 5, wherein the metal carbide comprises at least one of silicon carbide, titanium carbide, or tungsten carbide.

7. The method of claim 5, further comprising, prior to forming the hybrid coating, forming the high temperature antioxidant coating on the C/C composite substrate using at least one of chemical vapor deposition, plasma-enhanced chemical vapor deposition, pack cementation, melt infiltration, polymer pyrolysis, or direct chemical reaction between carbon and a molten metal.

8. The method of claim 5, further comprising forming the high temperature antioxidant coating on the C/C composite substrate via reactive slurry melt infiltration by:

applying carbon powder to a surface of the (C/C) composite substrate to force the carbon powder into one or more surface voids of the surface of the C/C composite substrate, wherein the carbon powder has a substantially same composition and morphology as a surface portion of the C/C composite substrate;

applying a metal slurry to the surface of the C/C composite substrate following the application of the carbon powder; and reacting a metal of the metal slurry with carbon of the carbon powder and carbon of the surface portion of the C/C composite substrate to form the high temperature antioxidant coating of a metal carbide on the C/C composite substrate.

9. The method of claim 8, wherein the metal carbide includes a stoichiometric ratio of a metal carbide phase of the metal to the carbon of the carbon powder that is greater than 1:1.

10. The method of claim 1, wherein a formation temperature of the metal oxide is lower than a thermal degradation temperature of the low temperature sealant.

11. The method of claim 1, wherein the reactive slurry melt infiltration comprises:

applying a metal slurry to a surface of the C/C composite substrate; and reacting a metal of the metal slurry to form the antioxidant coating on the C/C composite substrate.

12. The method of claim 11, wherein the metal slurry includes metal particles that include the metal oxide.

* * * * *